R. Safely
Water Wheel,
No. 39,498.   Patented Aug. 11, 1863.

Witnesses:

Inventor,
Robert Safely

UNITED STATES PATENT OFFICE.

ROBERT SAFELY, OF COHOES, NEW YORK.

IMPROVEMENT IN WATER-WHEELS.

Specification forming part of Letters Patent No. 39,498, dated August 11, 1863.

*To all whom it may concern:*

Be it known that I, ROBERT SAFELY, of Cohoes, Albany county, State of New York, have invented a method of securing the bearing-block and pivot of the shafts of turbine or other wheels revolving on vertical shafts from exposure to water, and providing for them the means of a constant supply of oil to preserve them from the wear incident to all vertically-running shafts whose lower pivots are exposed to water; and I declare the following specification, with the drawings forming part of it, to be a full and complete description of my invention.

Figure 1:
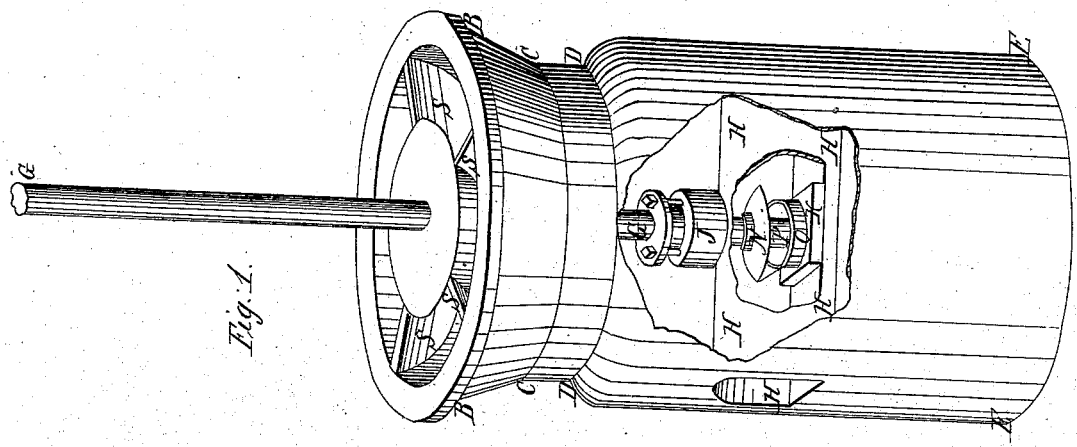
Figure 2:
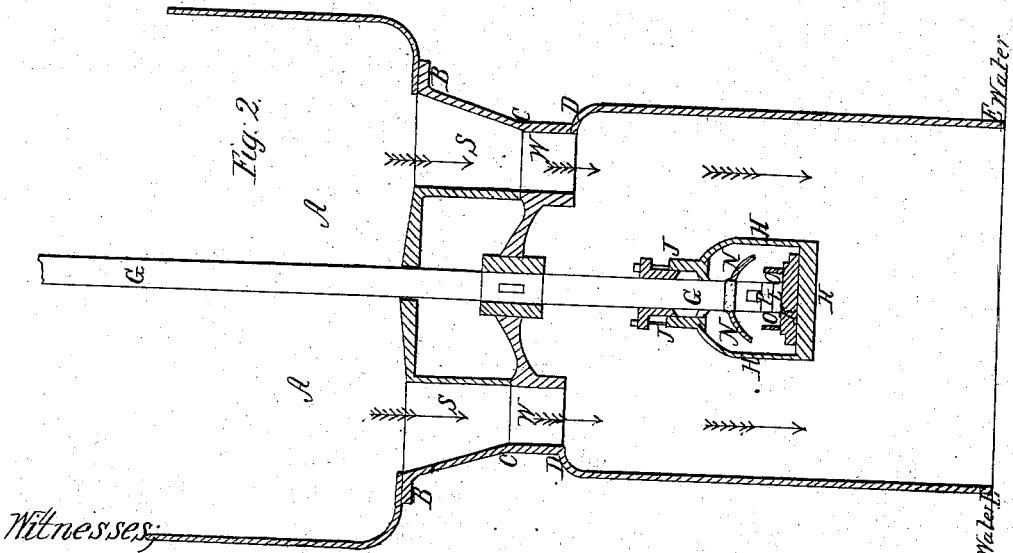

Figure 1 represents in perspective the casing or draft-box which incloses a turbine-wheel, with a portion of the walls removed to show the application of my improvement within it. Fig. 2 is a vertical section of the casing and machinery through its center at right angles to the line of length of the hollow bridge-tree.

Similar letters in these figures denote the same parts of the apparatus.

A is the forebay, into which the water from the mill-pond or reservoir is admitted; B C, that part of the casing within which is placed the chutes S, and C D that part within which revolves the wheel W of a (Jonval) turbine-wheel. D E is the lower part of the casing or draft-box, through which the water from the wheel passes off, and within which casing is placed the step upon which the lower end of the wheel-shaft G revolves. The step which supports the shaft is placed upon a bridge tree, and according to the usual construction is exposed to the drop and splash of the falling water, and the oil-cup for the pivot of the shaft soon becomes filled with water, which displaces the oil, and when the water is muddy carries into contact with the rubbing surfaces of the pivot and step gritty dirt, which soon destroys their smoothness, causing rapid wear and destruction to them.

To prevent this action is the object of my invention. To do this I employ a hollow beam or bridge-tree, H, forming within itself a chamber, which extends across through the casing D E, and is open at the ends. Upon the top of this beam I place a stuffing-box, J, fitted to receive the shaft G, and pack it water tight. On the bottom of the beam I place the step K, with a bronze or steel bearing-block, L, upon which rests the steel pivot P, terminating the shaft. This bearing-block with the base of the pivot lie within the cup O, which, when properly supplied with oil, keeps them constantly lubricated.

In order to defend the cup from any access of water which might leak through the stuffing-box, I place upon the shaft just above the cup a spherical or conically-shaped shield, N, extending beyond its edges, so as to throw all water upon the bottom of the beam, that it may run out at either end of it.

From this description it will be seen that the step and pivot are perfectly secured from the access of water, and can be kept continually running within a lubricating medium, and that by the open ends of the beam frequent access can be had to the shaft and cup to ascertain the condition of the pivot and step.

The drawing exhibits the application of my apparatus to a Jonval wheel, but it will be manifest that it is capable of application to the shafts of all turbine or other wheels running upon vertical shafts. The hollow beam is also intended to be applied to wheels which use no outside casing to direct the movement of the discharged water. In that case the ends of the beam are to be closed by doors to protect its interior from invasion by the falling water or its splashings.

What I claim as my invention, and desire to secure by Letters Patent, is—

The hollow beam H, in combination with the stuffing-box J and the oil-cup O, arranged and fitted substantially as described, and for the purposes set forth in this specification.

ROBERT SAFELY.

Witnesses:
S. W. ROSENDALE,
RICHD. VARICK DE WITT.